United States Patent
Ishida et al.

(12)

(10) Patent No.: US 10,273,101 B2
(45) Date of Patent: *Apr. 30, 2019

(54) SHEET CONVEYING DEVICE, IMAGE FORMING APPARATUS INCORPORATING THE SHEET CONVEYING DEVICE, AND OPTIONAL DEVICE INCORPORATING THE SHEET CONVEYING DEVICE

(71) Applicants: Masahiro Ishida, Kanagawa (JP); Toshiaki Takahashi, Tokyo (JP)

(72) Inventors: Masahiro Ishida, Kanagawa (JP); Toshiaki Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,546

(22) Filed: Dec. 12, 2017

(65) Prior Publication Data

US 2018/0099828 A1    Apr. 12, 2018

Related U.S. Application Data

(63) Continuation of application No. 15/221,969, filed on Jul. 28, 2016, now Pat. No. 9,873,579.

(30) Foreign Application Priority Data

Aug. 25, 2015    (JP) .................. 2015-165460

(51) Int. Cl.
*B65H 3/06*    (2006.01)
*B65H 5/38*    (2006.01)
(Continued)

(52) U.S. Cl.
CPC ................. *B65H 5/38* (2013.01); *B65H 1/04* (2013.01); *B65H 1/266* (2013.01); *B65H 3/06* (2013.01);
(Continued)

(58) Field of Classification Search
CPC .......... B65H 3/06; B65H 3/52; B65H 3/5223; B65H 3/66; B65H 9/006; B65H 7/20
(Continued)

(56) References Cited

U.S. PATENT DOCUMENTS 9,873,579 B2 *    1/2018    Ishida ...................... B65H 5/38
2012/0228818 A1    9/2012    Seki

FOREIGN PATENT DOCUMENTS

JP    2000-168995 A    6/2000
JP    2002-240979 A    8/2002
(Continued)

*Primary Examiner* — David H Bollinger
(74) *Attorney, Agent, or Firm* — Harness, Dickey & Pierce, P.L.C.

(57) ABSTRACT

A sheet conveying device, which is included in an image forming apparatus and an optional device attachable to the image forming apparatus, includes a sheet container, a sheet feeder, a separator, a guide, and a projection. The sheet container loads multiple sheets. The sheet feeder feeds a sheet out of the multiple sheets in the sheet container. The separator separates the sheet from another sheet fed together with the sheet. The guide having a guide surface to guide the sheet passing the separator such that the sheet is fed in a predetermined sheet conveying direction. An upstream end in the sheet conveying direction of the guide surface of the guide is located lower than a downstream end in the sheet conveying direction of the separator. The projection is disposed facing the separator at the upstream end in the sheet conveying direction of the guide surface.

19 Claims, 5 Drawing Sheets

(51) Int. Cl.
*B65H 1/04* (2006.01)
*B65H 7/20* (2006.01)
*H04N 1/00* (2006.01)
*B65H 1/26* (2006.01)
*B65H 3/52* (2006.01)

(52) U.S. Cl.
CPC ............ *B65H 3/5223* (2013.01); *B65H 7/20* (2013.01); *H04N 1/0032* (2013.01); *H04N 1/0057* (2013.01); *H04N 1/00551* (2013.01); *B65H 2404/5211* (2013.01); *B65H 2601/521* (2013.01); *H04N 2201/0094* (2013.01)

(58) Field of Classification Search
USPC ........................... 271/121, 10.01, 10.11, 242
See application file for complete search history.

(56) References Cited

FOREIGN PATENT DOCUMENTS

| | | |
|---|---|---|
| JP | 2004-018160 A | 1/2004 |
| JP | 2008-280179 A | 11/2008 |

* cited by examiner

SHEET CONVEYING DEVICE, IMAGE FORMING APPARATUS INCORPORATING THE SHEET CONVEYING DEVICE, AND OPTIONAL DEVICE INCORPORATING THE SHEET CONVEYING DEVICE

CROSS-REFERENCE TO RELATED APPLICATION

This patent application is a continuation of and claims priority under 35 U.S.C. §§ 120/121 to U.S. patent application Ser. No. 15/221,969, filed on Jul. 28, 2016, which is based on and claims priority pursuant to 35 U.S.C. § 119(a) to Japanese Patent Application No. 2015-165460, filed on Aug. 25, 2015, in the Japan Patent Office, the entire disclosures of each of which are hereby incorporated by reference herein.

BACKGROUND

Technical Field

This disclosure relates to a sheet conveying device, an image forming apparatus incorporating the sheet conveying device, and an optional device incorporating the sheet conveying device and attached to the image forming apparatus.

Related Art

Various types of electrophotographic image forming apparatuses are known to include a sheet conveying device to convey a sheet one by one from a sheet containing device that accommodates multiple sheets therein to an image forming apparatus or to an image forming device.

A sheet conveying device includes a sheet feed roller and a separation pad. The sheet feed roller feeds sheets loaded on a sheet tray. The separation pad separates sheets one by one when multiple sheets of the sheets are fed. The sheet conveying device further includes a guide plate having a guide surface that can contact with a bottom face of the sheet across an entire area in a sheet width direction that is a direction perpendicular to a sheet conveying direction. The guide plate is disposed downstream from the separation pad and upstream from an image forming part in the sheet conveying direction. The sheet fed from the sheet tray by the sheet feed roller and separated by the separation pad is guided by the guide surface of the guide plate toward the image forming part.

In the configuration in which a sheet is separated by the separation pad and is guided by the guide surface of the guide plate disposed downstream from the separation pad in the sheet conveying direction, it is preferable that an upstream end of the guide surface is located lower than a downstream end of the separation pad so as to provide a difference in height between the separation pad and the guide plate. This configuration can prevent a leading end of the sheet after passing by the separation pad from contacting the guide plate to cause a failure of sheet conveyance.

SUMMARY

At least one aspect of this disclosure provides a sheet conveying device including a sheet container, a sheet feeder, a separator, a guide, and a projection. The sheet container loads multiple sheets. The sheet feeder feeds a sheet out of the multiple sheets in the sheet container. The separator separates the sheet from another sheet fed together with the sheet. The guide having a guide surface to guide the sheet passing the separator such that the sheet is fed in a predetermined sheet conveying direction. An upstream end in the sheet conveying direction of the guide surface of the guide is located lower than a downstream end in the sheet conveying direction of the separator. The projection is disposed facing the separator at the upstream end in the sheet conveying direction of the guide surface.

Further, at least one aspect of this disclosure provides an image forming apparatus including an image forming device and the above-described sheet conveying device. The image forming device forms an image on a sheet. The above-described sheet conveying device conveys the sheet from the sheet container to the image forming device.

Further, at least one aspect of this disclosure provides an optional device including the above-described sheet conveying device configured to convey the sheet from the sheet container to an image forming apparatus.

DETAILED DESCRIPTION

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of an entire configuration and functions of an image forming apparatus 100 according to an embodiment of this disclosure.

Figure 1:
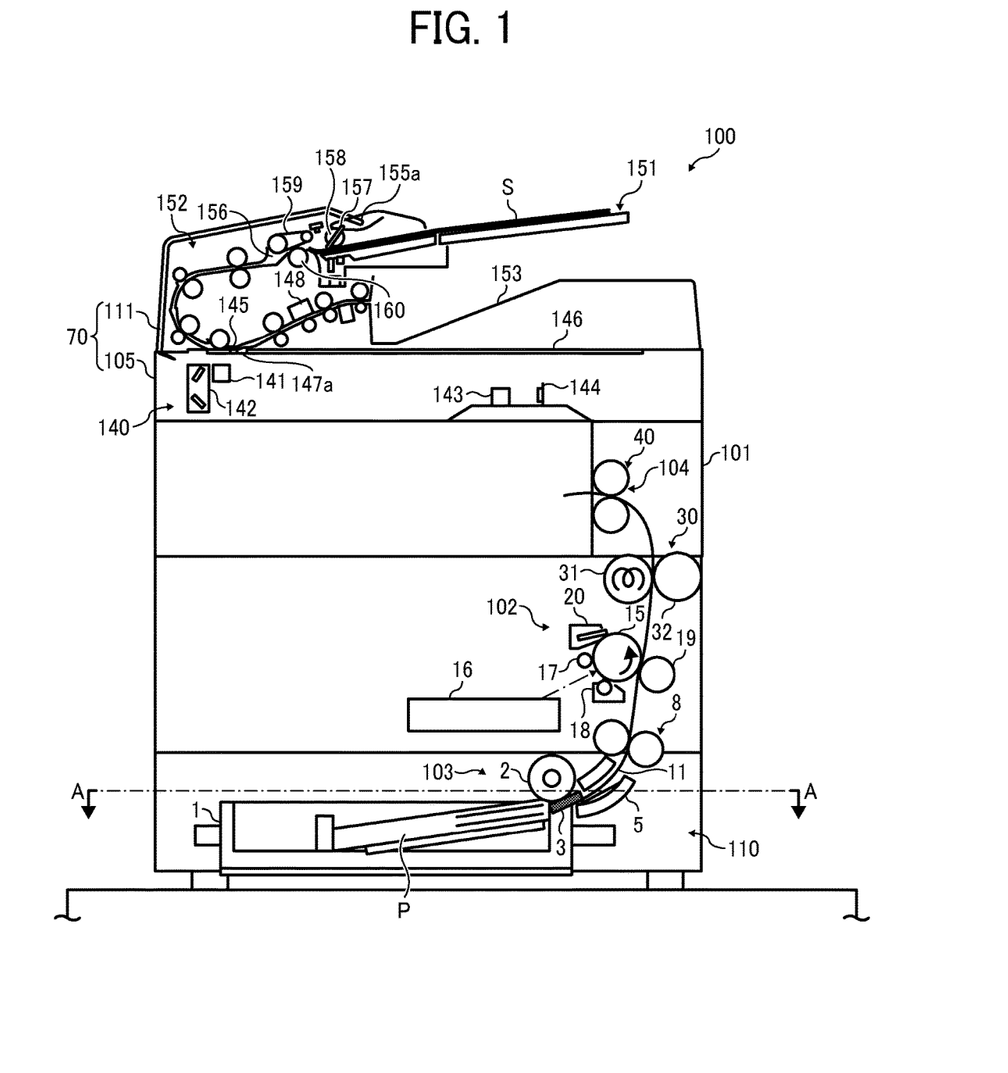
FIG. 1 is a schematic view of an image forming apparatus according to an embodiment of this disclosure.

FIG. 1 is a schematic diagram illustrating the image forming apparatus 100 according to the present embodiment of this disclosure.

It is to be noted that identical parts are given identical reference numerals and redundant descriptions are summarized or omitted accordingly.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying passage to a downstream side thereof; the term "width direction" indicates a direction basically perpendicular to the sheet conveying direction.

As illustrated in FIG. 1, the image forming apparatus 100 includes an apparatus body 101, an image forming part 102, and a sheet feeding part 103. The image forming part 102 that functions as an image forming device is disposed at a substantially center of the apparatus body 101. The sheet feeding part 103 is disposed below the image forming part 102. The sheet feeding part 103 is included in a sheet conveying device 110. The image forming apparatus 100 further includes a sheet ejecting part 104, a scanner 105, and an automatic document feeder (ADF) 111. The sheet ejecting part 104 is disposed above the image forming part 102. The scanner 105 is disposed above the sheet ejecting part 104 and functions as an image reader to read image data of an original document. The ADF 111 is attached on top of the apparatus body 101 of the image forming apparatus 100 to be openably closable to the apparatus body 101. It is to be noted that the ADF 111 functions as an optional device that can include the sheet conveying device 110 according to an embodiment of this disclosure. The scanner 105 and the ADF 111 form an image reading device 70.

The sheet feeding part 103 includes a sheet container 1 in which a sheet P is accommodated. The sheet container 1 is detachably attachable to the apparatus body 101. The sheet P is fed by a sheet feed roller 2 from the sheet container 1 to a sheet conveying passage 11 that extends from the sheet feeding part 103 to the sheet ejecting part 104 in a substantially vertical direction. After an image is formed and fixed in the image forming part 102, the sheet P is ejected by a pair of sheet output rollers 40.

The image forming part 102 includes a photoconductor 15 and an optical writing device 16.

The photoconductor 15 functions as an image bearer to rotate counterclockwise as indicated by arrow in FIG. 1.

The optical writing device 16 forms an electrostatic latent image on a surface of the photoconductor 15.

Image forming components are disposed around the photoconductor 15. These image forming components are a charging device 17, a developing device 18, a transfer roller 19, and a cleaning device 20 and are disposed in this order in a counterclockwise direction around the photoconductor 15.

The charging device 17 functions as a charger to uniformly charge the surface of the photoconductor 15.

The developing device 18 develops the electrostatic latent image formed on the surface of the photoconductor 15 into a visible toner image by supplying toner on the electrostatic latent image.

The transfer roller 19 transfers the toner image formed by the developing device 18 onto the sheet P.

The cleaning device 20 cleans the photoconductor 15 by removing residual toner remaining on the surface of the photoconductor 15 after the toner image has been transferred onto the sheet P.

A fixing device 30 is also included in the image forming part 102 and is disposed between the transfer roller 19 and the sheet ejecting part 104. The fixing device 30 includes a heat roller 31 and a pressure roller 32. The toner image transferred onto the sheet P by the transfer roller 19 is fixed to the sheet P by application of heat and pressure.

The optical writing device 16 emits laser light to irradiate the surface of the photoconductor 15 based on image data of an original document read by the scanner 105 or image data inputted via a personal computer (PC). By optically writing the image data by the optical writing device 16, an electrostatic latent image is formed on the surface of the photoconductor 15.

The scanner 105 includes a first surface scanning device 140, a first carriage 141, a second carriage 142, an image forming lens 143, an image forming unit 144, and a first exposure glass 145.

The first surface scanning device 140 scans and reads an image on one side of an original document sheet S, for example, the image on the front surface of the original document sheet S, which is conveyed to the first exposure glass 145. The "first surface" of the first surface scanning device 140 represents one side of the original document sheet S that is automatically fed, for example, the front surface of the original document sheet S.

The first carriage 141 includes a light source and at least one mirror.

The second carriage 142 includes at least one mirror.

The first carriage 141, the second carriage 142, the image forming lens 143, the image forming unit 144, and the first exposure glass 145 are disposed on the side of the apparatus body 101.

The scanner 105 further includes a second exposure glass 146 and a contact member 147a.

The second exposure glass 146 holds the original document sheet S thereon.

The contact member 147a contacts one edge side of the original document sheet S and positions the original document sheet S.

The first carriage 141 is movably disposed below the first exposure glass 145 and the second exposure glass 146 and can be moved from left to right on FIG. 1 and can adjust the position of the image. The first carriage 141 can receive light emitted from the light source and reflect by the at least one mirror so as to irradiate on the side of an exposed side of the original document sheet S. The light reflected on the original document sheet S is further reflected on the at least one mirror mirrors of the first carriage 141 and the at least one mirror of the second carriage 142, and eventually the image forming lens 143 forms an image. Then, the formed image is scanned by the image forming unit 144.

The scanner 105 causes the first carriage 141 and the second carriage 142 to move at a speed ratio of 2:1, for example, with the light source turned on. At the same time, the image formed side of the original document sheet S placed on the second exposure glass 146 and the image data of the original document can be optically scanned.

Then, the image forming unit 144 of the scanner 105 reads the image on the original document sheet S when exposing and scanning the sheet P. By so doing, a fixed original document reading function (a flat bed scanner function) is performed.

The scanner 105 can cause the first carriage 141 to stop at a given position immediately below the first exposure glass 145. Then, a moving document scanning function (a document feeding scanning or DF scanning function) can be performed without moving various optical units such as the light source and the reflection mirrors. The moving document scanning function is also referred to as a document feeding scanning or DF scanning function by which the first surface of the original document sheet S is scanned during automatic document conveyance of the original document sheet S.

In addition to the first surface scanning device 140 included in the scanner 105, the image forming apparatus 100 also includes a second surface scanning device 148 that is embedded on the side of the ADF 111.

The second surface scanning device 148 scans an image formed on the second surface, for example, the back surface of the recording medium P, for example, after the recording medium P has passed on the first exposure glass 145.

The ADF 111 is openably closable attached on top of the apparatus body 101 of the image forming apparatus 100 via hinges. The ADF 111 is connected to the apparatus body 101. The ADF 111 can be rotated or turned between an open position at which the first exposure glass 145 and the second exposure glass 146 of the scanner 105 are exposed and a closed position at which the first exposure glass 145 and the second exposure glass 146 are covered and hidden.

The ADF 111 is an automatic document feeder of sheet through system. The ADF 111 includes an original document table 151, a document conveying unit 152, and an original document discharging tray 153.

The original document table 151 functions as an original document loader.

The document conveying unit 152 includes various rollers and guide members.

The original document discharging tray 153 stacks the original document sheet(s) thereon after each image formed on the original document sheet(s) thereon has been read.

The document conveying unit 152 further includes a pickup roller 158, a sheet feeding belt 159, and a reverse roller 160.

The pickup roller 158 is disposed near and downstream from a document inlet slot 155a in the document feeding direction.

The sheet feeding belt 159 is an endless belt in a loop form.

The sheet feeding belt 159 and the reverse roller 160 (a sheet feeding body) are disposed facing each other with a document conveying path 156 therebetween.

The pickup roller 158 is driven by a pickup motor. At the contact position, the pickup roller 158 frictionally picks up some of uppermost original document sheets S (desirably, a single uppermost original document sheet S) from the bundle of original document sheets S placed on the original document table 151.

The sheet feeding belt 159 is rotated by a sheet feed motor, so that one side of the sheet feeding belt 159 moves in the document feeding direction.

The reverse roller 160 is rotatable in a reverse direction that is a direction opposite to the document feeding direction of the sheet feeding belt 159 and includes a torque limiter. The reverse roller 160 contacts the sheet feeding belt 159 with a predetermined pressure. When contacting the sheet feeding belt 159 directly or with a single original document sheet S held therebetween, the reverse roller 160 is rotated with rotation of the sheet feeding belt 159 in a counterclockwise direction.

When the multiple original document sheets S enter between the sheet feeding belt 159 and the reverse roller 160, the reverse roller 160 exerts a force to rotate with the sheet feeding belt 159 in the counterclockwise direction that is lower than a force corresponding to the set torque of the torque limiter. Therefore, the reverse roller 160 pushes an extra original document sheet S or extra original document sheets S back to the upstream side from the contact part where the sheet feeding belt 159 and the reverse roller 160 contact to each other. By so doing, the reverse roller 160 can prevent the original document sheet S from multifeeding.

The sheet container 1 of the sheet feeding part 103 includes the sheet feed roller 2, a guide surface 1a, and a separation unit 3. The guide surface 1a guides the sheet P that is fed by the sheet feed roller 2, specifically a lower surface of the sheet P. The separation unit 3 is disposed at a center in a sheet width direction WD on the guide surface 1a. The sheet width direction WD is a direction perpendicular to the sheet conveying direction on the guide surface 1a. The separation unit 3 is disposed in contact with the sheet feed roller 2 to form a sheet separation nip region. When multiple sheets P are fed together by the sheet feed roller 2 from the sheet container 1, the multiple sheets P are separated one by one in the sheet separation nip region.

It is to be noted that the separation unit 3 may include a separation pad disposed facing the sheet feed roller 2. The separation pad may include a material having a friction coefficient greater than the guide surface 1a relative to the sheet P.

Further, the sheet conveying device 110 includes the sheet feeding part 103, a curved guide plate 5 and a pair of registration rollers 8.

The curved guide plate 5 includes a guide surface 5a to guide the sheet P fed from the sheet feeding part 103. Since the curved guide plate 5 is curved, the guide surface is also curved to convey the sheet P toward the pair of registration rollers 8.

The pair of registration rollers 8 functions as a sheet conveyor to convey the sheet P guided by the curved guide plate 5.

After being fed by the sheet feed roller 2 of the sheet feeding part 103 from a bundle of sheets P accommodated in the sheet container 1 and separated one by one by the separation unit 3, the sheet P is guided by the guide surface 5a of the curved guide plate 5 to be conveyed to the pair of registration rollers 8. At this time, the rotation of the pair of registration rollers 8 is stopped, and therefore the leading end of the sheet P contacts a nip region of the pair of registration rollers 8. In this condition, the sheet P is continuously fed by the sheet feed roller 2 toward the pair of registration rollers 8. By so doing, the sheet P becomes slackened to correct skew of the sheet P. Then, the pair of registration rollers 8 is rotated at a predetermined timing, so that the sheet P is conveyed to a transfer nip region that is formed by the transfer roller 19 and the photoconductor 15, both are disposed downstream from the pair of registration rollers 8 in the sheet conveying direction. Accordingly, the toner image is transferred from the photoconductor 15 to the sheet P in the transfer nip region.

Figure 2:
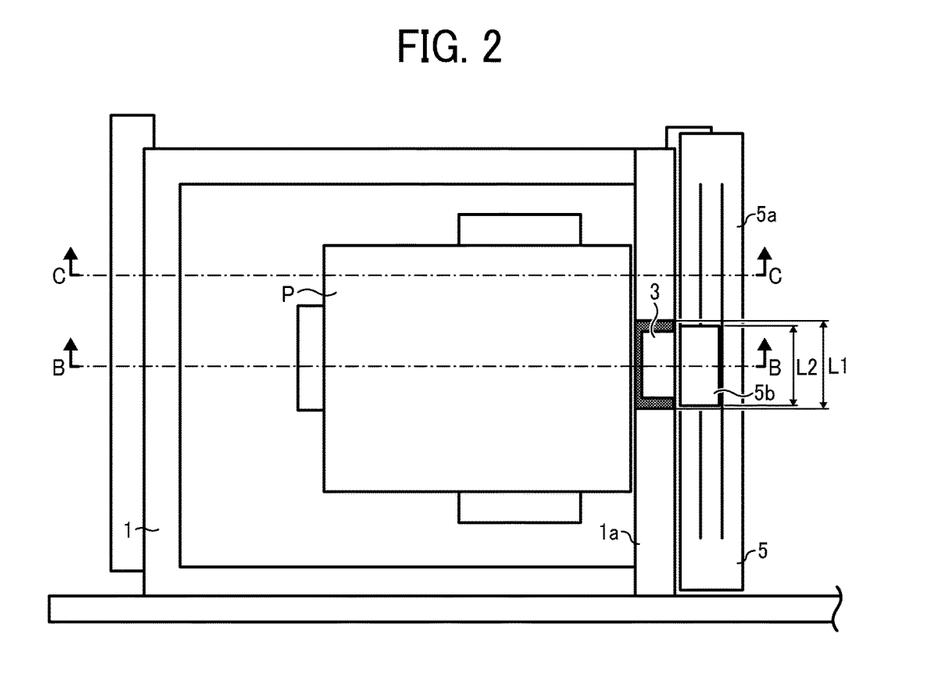
FIG. 2 is a cross sectional view of a sheet conveying device included in the image forming apparatus along a line A-A of FIG. 1.

FIG. 2 is a cross sectional view of the sheet conveying device 110 included in the image forming apparatus 100 along a line A-A of FIG. 1.

Figure 3:
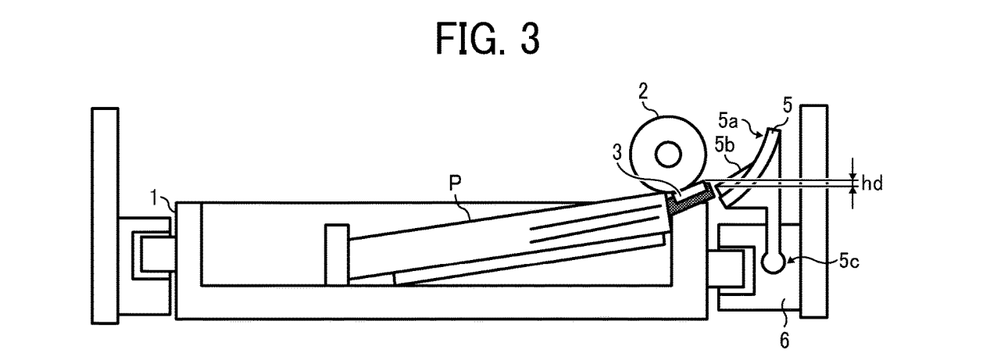
FIG. 3 is a cross sectional view of the sheet conveying device included in the image forming apparatus along a line B-B of FIG. 2.

In the present embodiment, as illustrated in FIG. 3, a projection 5b is disposed facing the separation unit 3 at an upstream end of the guide surface 5a of the curved guide plate 5. Specifically, the projection 5b is disposed at the upstream end in the sheet conveying direction of the guide surface 5a of the curved guide plate 5 and is disposed at the center in the sheet width direction WD that is a direction perpendicular to the sheet feed direction.

A reference letter "L1" indicates a separation unit width that is a width of the separation unit 3 in the sheet width direction WD and a reference letter "L2" indicates a projection width that is a width of the projection 5b in the sheet width direction WD. As illustrated in FIG. 2, the projection width L2 is smaller (shorter) than the separation unit width L1.

FIG. 3 is a cross sectional view of the sheet conveying device 110 included in the image forming apparatus 100 along a line B-B of FIG. 2.

The curved guide plate 5 is attached to a rail 6 that slidably holds the sheet container 1 so that the sheet container 1 is detachably attachable to the apparatus body 101. In the present embodiment, as illustrated in FIG. 3, a downstream end in the sheet conveying direction of the separation unit 3 is located higher than an upstream end in the sheet conveying direction of the projection 5b, so as to provide a height difference hd between the separation unit 3 and projection 5b. It is to be noted that it is preferable to set a smaller height difference hd.

By providing the height difference hd between the separation unit 3 and the projection 5b, the leading end of the sheet P after passing through the sheet separation nip region between the sheet feed roller 2 and the separation unit 3 in the sheet width direction WD is prevented from contacting the curved guide plate 5 or being caught by the curved guide plate 5.

Further, the height difference hd is smaller by a height of the projection 5b between the downstream end of the separation unit 3 and the upstream end of the guide surface 5a on which the projection 5b is mounted. According to this configuration, when compared with a configuration in which the guide surface 5a does not have the projection 5b at a position where the guide surface 5a faces the separation unit 3, this configuration can reduce more impact given to the trailing end of the sheet P when the trailing end of the sheet P contacts the guide surface 5a after the sheet P has passed through the sheet separation nip region formed by the sheet feed roller 2 and the separation unit 3. Accordingly, the configuration according to the present embodiment can reduce a sound of collision generated when the trailing end of the sheet P contacts the guide surface 5a by the same amount of the above-described impact.

Figure 4:
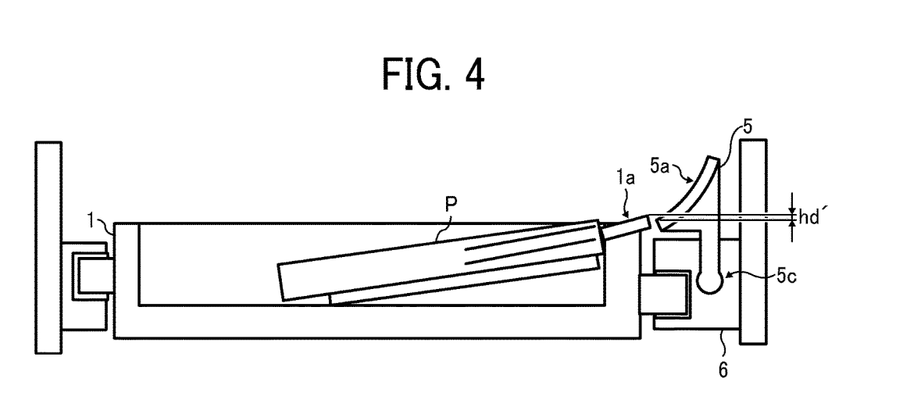
FIG. 4 is a cross sectional view of the sheet conveying device included in the image forming apparatus along a line C-C of FIG. 2.

FIG. 4 is a cross sectional view of the sheet conveying device 110 included in the image forming apparatus 100 along a line C-C of FIG. 2.

In the present embodiment, as illustrated in FIG. 4, the downstream end in the sheet conveying direction of the guide surface 1a is located higher than the upstream end in the sheet conveying direction of the guide surface 5a. That is, the upstream end in the sheet conveying direction of the guide surface 5a is located lower than the downstream end in the sheet conveying direction of the guide surface 1a. Accordingly, a height difference hd' between the guide surface 1a and the guide surface 5a is generated. It is to be noted that it is preferable to set the smaller height difference hd'.

By providing the height difference hd' between the guide surface 1a and the guide surface 5a, the leading end of the sheet P guided by the guide surface 1a in the sheet width direction WD is prevented from contacting the curved guide plate 5 or being caught by the curved guide plate 5.

The sheet P accommodated in the sheet container 1 is fed by the sheet feed roller 2 and separated by the separation unit 3 from the other sheets P fed together, and then is conveyed to the pair of registration rollers 8. A sheet conveying passage such as the sheet conveying passage 11 extending between the sheet feed roller 2 and the pair of registration rollers 8 is defined by the guide surface 1a and the curved guide plate 5 provided in the sheet container 1. After the leading end of the sheet fed by the sheet feed roller 2 contacts the pair of registration rollers 8, the sheet feed roller 2 slackened the sheet P by a predetermined amount and then stops rotating. Thereafter, the sheet feed roller 2 starts rotating again in synchronization with rotation of the pair of registration rollers 8 in order to convey the sheet P to the image forming part 102. Even after the trailing end of the sheet P has passed the sheet feed roller 2, the sheet feed roller 2 rotates for a predetermined period of time. By driving the sheet feed roller 2 until the trailing end of the sheet P passes the sheet feed roller 2, the sheet P passes the sheet feed roller 2 while the sheet P remains slackened. Therefore, the toner image is not adversely affected by the sheet P.

By contrast, by driving the sheet feed roller 2 until the trailing end of the sheet P with slack, the trailing end of the sheet P rattles near the separation unit 3 in the sheet width direction WD when the sheet P passes the sheet feed roller 2. Therefore, the trailing end of the sheet P may contact the guide surface 5a of the curved guide plate 5, resulting in occurrence of a relatively large sound of collision. The separation unit 3 and an area around the separation unit 3 are located higher than the guide surface 1a that is disposed at a downstream end in the sheet conveying direction of the sheet container 1. At the same time, the height difference hd' between the guide surface 1a of the sheet container 1 and the guide surface 5a of the curved guide plate 5 is set to be relatively small. As a result, a height difference is generated between the separation unit 3 and the guide surface 5a of the curved guide plate 5. Accordingly, a sound of collision is generated when the trailing end of the sheet P rattles.

However, the difference in height can cause a trailing end of the sheet after passing by the separation pad to contact the guide surface, resulting in occurrence of sound of collision. As the difference in height increases, a degree of impact generated when the trailing end of the sheet contacts the guide surface also increases. As a result, the sound of collision becomes greater.

In order to address this inconvenience, as described above, the configuration in the present embodiment includes the projection 5b that is mounted on the upstream end in the sheet conveying direction of the guide surface 5a, at the position where the guide surface 5a faces the separation unit 3. By so doing, the height difference between the separation unit 3 and the guide surface 5a can be reduced and another height difference between the guide surface 5a and a different unit. Therefore, the sound of impact can be reduced by the same amount.

Figure 5:
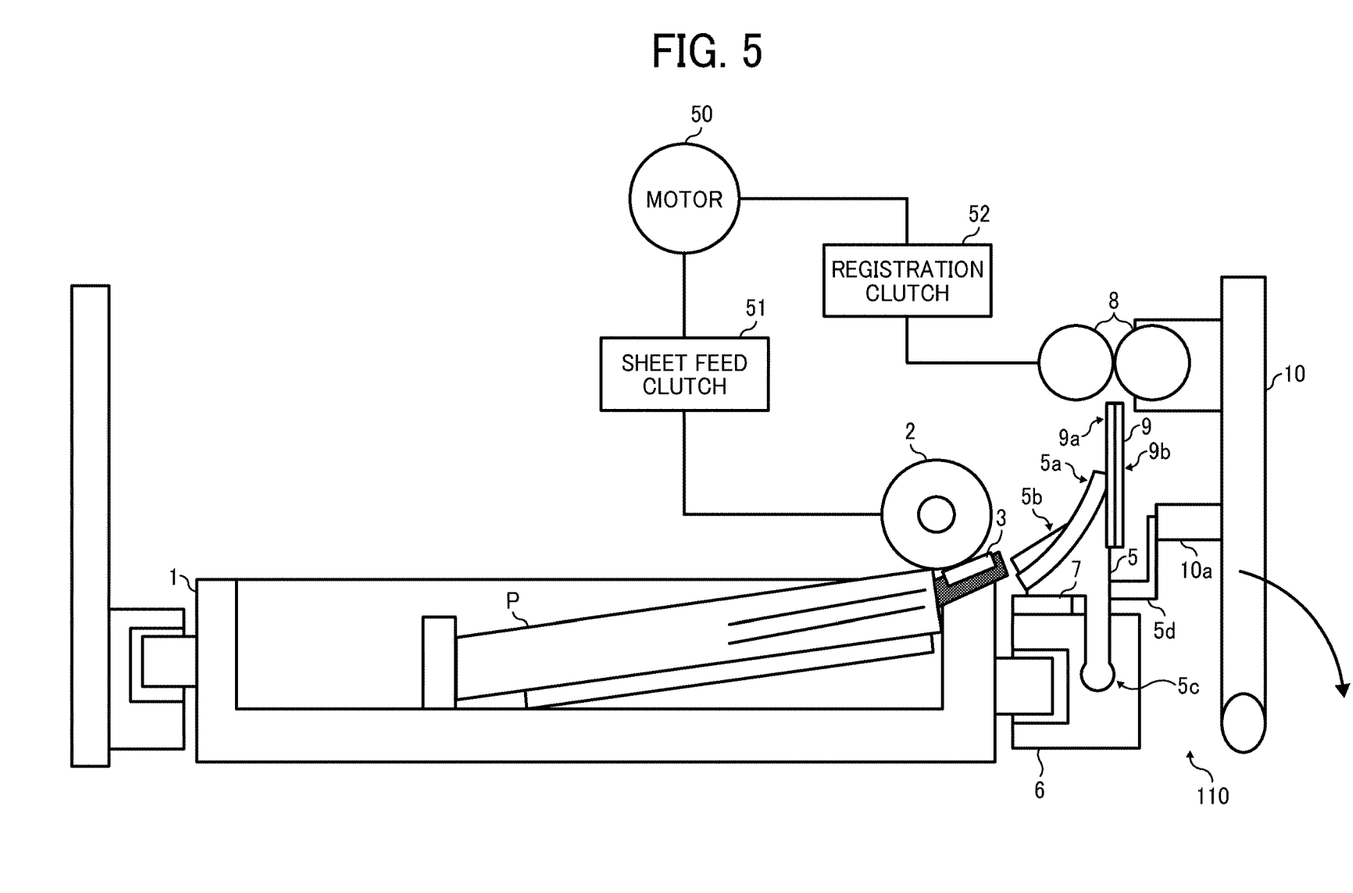
FIG. 5 is a diagram illustrating the sheet conveying device with a cushioning material and a two-ply sheet member for conveying a sheet to a pair of registration rollers.

FIG. 5 is a diagram illustrating the sheet conveying device 110 with a cushioning material 7 and a two-ply sheet member such as a sheet guide 9 for conveying the sheet P to the pair of registration rollers 8.

The cushioning material 7 is disposed between the rail 6 and the curved guide plate 5. The cushioning material 7 reduces impact on the curved guide plate 5 when the sheet P contacts the curved guide plate 5. As an example of the cushioning material 7, a material including polyurethane can be employed. Accordingly, the cushioning material 7 includes an elastic body.

Further, it is preferable that the cushioning material 7 is disposed on a top face of the rail 6 across an entire area of the curved guide plate 5 in the sheet width direction WD that is perpendicular to the sheet conveying direction.

Accordingly, the configuration according to the present embodiment can reduce an impact generated when the sheet P contacts the curved guide plate 5.

Further, a sheet guide 9 is disposed on a side face of the curved guide plate 5. Specifically, a lower end of the sheet guide 9 is attached by an adhesive member such as a double sided tape. The sheet guide 9 includes resin sheet members 9a and 9b in two layers. Respective lower ends of the sheet members 9a and 9b are adhered and fixed to each other by the adhesive member such as a double sided tape. Consequently, respective upper ends of the sheet members 9a and 9b are made as free ends. After passing by the curved guide plate 5 toward the pair of registration rollers 8, the sheet P is guided by the sheet guide 9 to be conveyed to the pair of registration rollers 8. By guiding the sheet P by the sheet guide 9 after the sheet P has passed the curved guide plate 5, when the sheet P contacts the sheet guide 9, the sheet members 9a and 9b of the sheet guide 9 bend to absorb the impact on the sheet P. Accordingly, the configuration according to the present embodiment can reduce the sound of collision generated when the sheet P contacts the sheet guide 9, thereby achieving a silencing effect.

Further, this configuration provides the sheet guide 9 including the two-ply resin sheet members 9a and 9b. When compared to a configuration including a sheet guide including a single resin sheet member, this configuration can enhance an effect to absorb the impact, and therefore can enhance the silencing effect.

Figure 6:
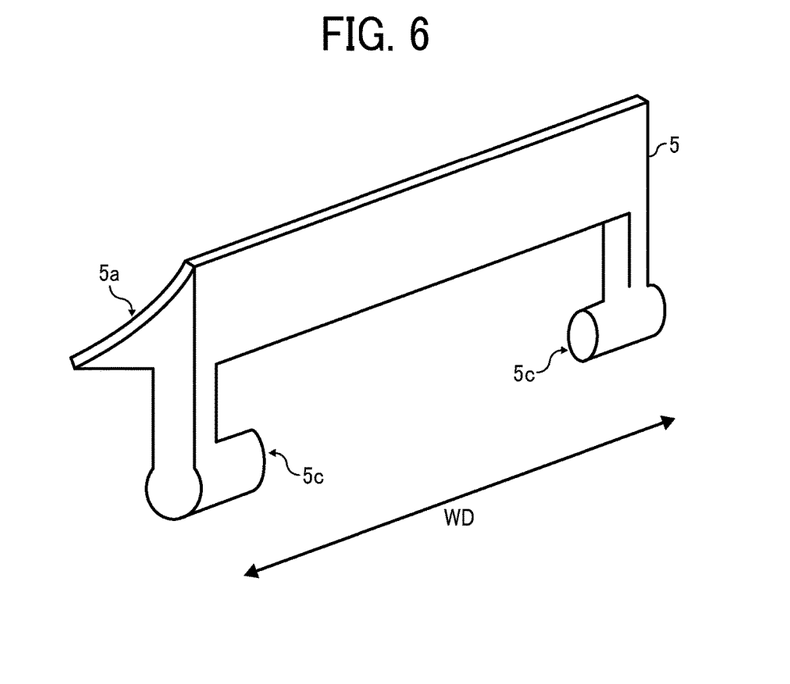
FIG. 6 is a perspective view of an exterior of a curved guide plate included in the sheet conveying device.

FIG. 6 is a perspective view of an exterior of the curved guide plate 5 included in the sheet conveying device 110.

In the present embodiment, as illustrated in FIG. 6, two support shafts 5c are mounted on a lower part of the curved guide plate 5 at both ends in the sheet width direction WD. The support shafts 5c are rotatably supported by both end faces of the rail 6 in the sheet width direction WD. According to this configuration, the curved guide plate 5 can rotate about the support shafts 5c between a fixed position and a retreating position. The fixed position is a first position at which the curved guide plate 5 is positioned by contacting the cushioning material 7 disposed on the top face of the rail 6. The retreating position is a second position at which the curved guide plate 5 is separated from the cushioning material 7 from the first position toward an outside of the sheet conveying device 110.

A door 10 that functions as a cover is disposed openably closable with respect to the apparatus body 101. The door 10 includes a fixing member 10a. The fixing member 10a functions as a state changing body to change a state of the door 10 by contacting and separating the door 10 with respect to the curved guide plate 5. The fixing member 10a contacts the curved guide plate 5 to fix and position the door 10 when the door 10 is closed to the apparatus body 101.

Further, a contact target body 5*d* is mounted on a side face of the curved guide plate 5 at a position facing the door 10 when the door 10 is closed to the apparatus body 101. That is, when the door 10 is closed to the apparatus body 101, the fixing member 10*a* contacts the contact target body 5*d*. By so doing, a lower face of the curved guide plate 5 contacts the cushioning material 7 to be located at the fixed position. Accordingly, in a state in which the door 10 is closed to the apparatus body 101, the cushioning material 7 and the fixing member 10*a* of the door 10 fix and position the curved guide plate 5.

By contrast, in a state in which the door 10 is open relative to the apparatus body 101, the curved guide plate 5 is not fixed by the cushioning material 7 and the fixing member 10*a* of the door 10, that is, the curved guide plate 5 is rotatably attached to the rail 6. When a paper jam occurs in the sheet conveying passage (e.g., the sheet conveying passage 11) from the sheet feed roller 2 to the pair of registration rollers 8, the door 10 is opened from the apparatus body 101 to rotate the curved guide plate 5 outwardly from the image forming apparatus 100 to position the curved guide plate 5 to the retreating position. Consequently, the sheet conveying passage is released to remove the jammed sheet P therefrom easily.

In the present embodiment, as illustrated in FIG. 5, the sheet feed roller 2 and the pair of registration rollers 8 are driven by a single motor 50 that functions as a drive source via respective drive transmission mechanisms for the sheet feed roller 2 and the pair of registration rollers 8. The drive transmission mechanism for the sheet feed roller 2 includes a sheet feed clutch 51 that functions as a drive transmission state switcher to switch a drive transmission from the motor 50 to the sheet feed roller 2 between a drive activated state and a drive deactivated state. Similarly, the drive transmission mechanism for the pair of registration rollers 8 includes a registration clutch 52 that functions as a drive transmission state switcher to switch a drive transmission from the motor 50 to the pair of registration rollers 8 between a drive activated state and a drive deactivated state.

Figure 7:
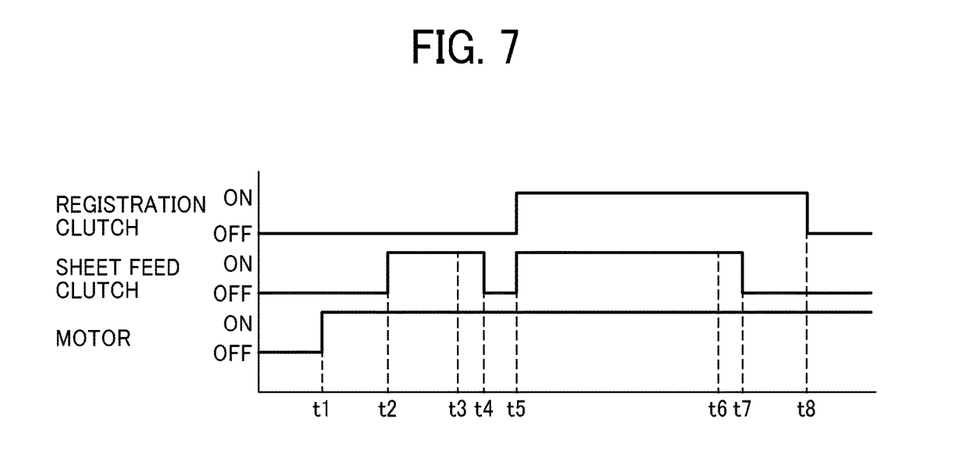
FIG. 7 is a timing chart illustrating timings of switching activation and deactivation of a motor, a sheet feed clutch, and a registration clutch.

FIG. 7 is a timing chart illustrating timings of switching activation and deactivation of the motor 50, the sheet feed clutch 51, and the registration clutch 52.

In FIG. 7, the motor 50 is turned on at a time t1 and the sheet feed clutch 51 is turned on at a time t2. As the sheet feed roller 2 rotates, the sheet P is fed from the sheet container 1 toward the pair of registration rollers 8. By so doing, the leading end of the sheet P contacts the pair of registration rollers 8 at a time t3. In this state in which the leading end of the sheet P is in contact with the pair of registration rollers 8, the sheet feed roller 2 continues rotating to feed the sheet P. When the sheet feed clutch 51 is turned off at a time t4, the rotation of the sheet feed roller 2 stops. Consequently, the sheet P is slackened by a predetermined target amount. Thereafter, the sheet feed clutch 51 and the registration clutch 52 are turned on at a time t5 to start rotating the sheet feed roller 2 and the pair of registration rollers 8 again to convey the sheet P. Then, as the trailing end of the sheet P passes at a time t6 through the sheet separation nip region where the sheet feed roller 2 and the separation unit 3 contact, the sheet feed clutch 51 is turned off at a time t7 to stop the rotation of the sheet feed roller 2 and the registration clutch 52 is turned off at a time t8 to stop the rotation of the pair of registration rollers 8.

As illustrated in FIG. 7, the sheet P is conveyed with slack from a time in which the leading end of the sheet P is held by the nip region of the pair of registration rollers 8 to a time in which the leading end of the sheet P passes the nip region of the sheet feed roller 2 and the separation unit 3. That is, a linear velocity of the sheet feed roller 2 is greater than a linear velocity of the pair of registration rollers 8. This state can be expressed as: Linear Velocity of the Sheet Feed Roller 2>Linear Velocity of the Pair of Registration Rollers 8. By performing the above-described sheet conveyance of the sheet P, the silencing effect can be enhanced due to a synergistic effect with the projection 5*b* mounted on the curved guide plate 5.

It is to be noted that, in an image forming system connected to an optional device that supplies sheets to an image forming apparatus, the configurations and controls of the above-described sheet conveying device 110 may be employed to at least one of the image forming apparatus and the optional device. Accordingly, the sound of impact that can be generated in the image forming apparatus and the optional device included in the image forming system can be reduced.

It is also to be noted that, in the present embodiment of this disclosure, the ADF 111 is illustrated and described as to the optional device that can include the above-described sheet conveying device 110. However, this disclosure is not limited to the ADF 111. For example, a bypass tray and a paper bank can be applied as an optional device according to this disclosure. The bypass tray can be attached to one side of an image forming apparatus to feed a sheet from a sheet tray other than the sheet container 1. The paper bank (e.g., a sheet container that can accommodate a large amount of sheets) can be attached to one side of an image forming apparatus to feed a large number of sheets.

The configurations according to the above-descried embodiments are not limited thereto. This disclosure can achieve the following aspects effectively.

Aspect A.

In Aspect A, a sheet conveying device (for example, the sheet conveying device 110) includes a sheet container (for example, the sheet container 1), a sheet feeder (for example, the sheet feed roller 2), a separator (for example, the separation unit 3), a guide (for example, the curved guide plate 5), and a projection (for example, the projection 5*b*). The sheet container accommodates multiple sheets (for example, the sheet P) therein. The sheet feeder feeds a sheet (for example, the sheet P) out of the multiple sheets in the sheet container. The separator separates the sheet from another sheet fed together with the sheet. The guide has a guide surface (for example, the guide surface 5*a*) to guide the sheet after the separator such that the sheet is fed in a predetermined sheet conveying direction. An upstream end in the sheet conveying direction of the guide surface of the guide is located lower than a downstream end in the sheet conveying direction of the separator. The projection is disposed facing the separator at the upstream end in the sheet conveying direction of the guide surface.

In Aspect A, the height difference between the leading end of the sheet after passing through the sheet separation nip region between the sheet feeder and the separator and an upstream end in the sheet conveying direction of the guide at a position where the projection is provided becomes smaller by a height of the projection disposed on the guide surface facing the separator at the upstream end of the guide surface in the sheet conveying direction.

According to this configuration, when compared with a configuration in which the guide surface does not have the projection at the position where the guide surface faces the separation unit, this configuration can reduce more impact given to the trailing end of the sheet when the trailing end of the sheet contacts the guide surface after passing through the sheet separation nip region formed by the sheet feeder and the separator.

Accordingly, the configuration according to the present embodiment can reduce a sound of collision generated when the trailing end of the sheet contacts the guide surface.

Aspect B.

In Aspect A, the sheet container includes a container guide surface (for example, the guide surface 1a) disposed at a downstream end in the sheet conveying direction of the sheet container. The container guide surface is configured to guide a lower surface of the sheet. The upstream end in the sheet conveying direction of the guide surface of the guide is located lower than a downstream end in the sheet conveying direction of the container guide surface of the sheet container. The separator is located higher than the container guide surface of the sheet container.

According to this configuration, as described in the above-described embodiment, the leading end of the sheet guided by the container guide surface in the sheet width direction WD is prevented from contacting a wall surface located lower than the guide surface of the guide, and therefore a sheet conveyance failure can be prevented.

Aspect C.

In Aspect A or Aspect B, the sheet conveying device further includes a sheet conveyor (for example, the pair of registration rollers 8) disposed higher than the sheet container. The sheet conveyor is configured to convey the sheet fed from the sheet container. The guide surface is curved such that the sheet is conveyed toward the sheet conveyor.

According to this configuration, as described in the above-described embodiments, the sheet becomes slackened. Accordingly, this configuration can prevent any adverse effect to the image via the sheet and, at the same time, the sound of collision can be reduced.

Aspect D.

In any one of Aspect A through Aspect C, a width of the projection in a sheet width direction (for example, the sheet width direction WD) perpendicular to the sheet conveying direction is smaller than a width of the separator in the sheet width direction.

According to this configuration, as described in the above-described embodiments, the leading end of the sheet is prevented from being caught by the projection disposed on the guide.

Aspect E.

In any one of Aspect A through Aspect D, the guide is movable between a first position at which the guide is positioned (for example, the first position at which the curved guide plate 5 is positioned by contacting the cushioning material 7) and a second position at which the guide is moved outwardly from the first position (for example, the second position at which the curved guide plate 5 is separated from the cushioning material 7 form the first position toward the outside of the sheet conveying device 110). In addition, the sheet conveying device further includes a cover (for example, the door 10) and a state changing body (for example, the fixing member 10a). The cover is disposed openably closable to an apparatus body (for example, the apparatus body 101) of an image forming apparatus (for example, the image forming apparatus 100). The state changing body is configured to position the guide when the cover contacts the apparatus body to close and configured to release the guide when the cover separates from the apparatus body to open.

According to this configuration, as described in the above-described embodiments, the operability in removal of a jammed sheet or jammed sheets can be enhanced when a paper jam occurs.

Aspect F.

In Aspect E, the sheet conveying device further includes an elastic body (for example, the cushioning material 7). The state changing body causes the guide to contact the elastic body to fix the guide.

According to this configuration, as described in the above-described embodiments, an impact that occurs when the sheet contacts the guide can be reduced.

Aspect G.

In Aspect F, the elastic body is disposed across an entire area of the guide in a sheet width direction (for example, the sheet width direction WD) perpendicular to the sheet conveying direction.

According to this configuration, as described in the above-described embodiments, an impact that occurs when the sheet contacts the guide can be reduced more effectively.

Aspect H.

In any one of Aspect A through Aspect G, the sheet conveying device further includes a sheet guide (for example, the sheet guide 9) including resin sheet bodies (for example, the sheet members 9a and 9b). The sheet guide is configured to guide the sheet after passing the guide surface of the guide. The resin sheet bodies of the sheet guide are disposed in two layers to the guide.

According to this configuration, as described in the above-described embodiments, an impact that occurs when the sheet guide guides the sheet after the sheet has passed the guide surface can be reduced, and therefore the silencing effect can be enhanced.

Aspect I.

In any one of Aspect C through Aspect H, the sheet conveying device further includes a first drive transmission state switcher (for example, the sheet feed clutch 51) and a second drive transmission state switcher (for example, the registration clutch 52). The first drive transmission state switcher is configured to switch a drive transmission from a drive source (for example, the motor 50) to the sheet feeder between a drive activated state and a drive deactivated state. The second drive transmission state switcher is configured to switch a drive transmission from the drive source to the sheet conveyor between a drive activated state and a drive deactivated state.

According to this configuration, as described in the above-described embodiments, an appropriate timing to convey the sheet can be obtained.

Aspect J.

In any one of Aspect A through Aspect I, the sheet feeder continues rotating for a predetermined period of time after a trailing end of the sheet has passed through a nip region where the sheet feeder and the separator contact (for example, the sheet separation nip region).

According to this configuration, as described in the above-described embodiments, the trailing end of the sheet passes through the nip region while the sheet remains slackened. Therefore, a negative impact to the image can be prevented.

Aspect K.

In Aspect K, an image forming apparatus (for example, the image forming apparatus 100) includes an image forming device (for example, the image forming part 102) and the sheet conveying device according to any one of Aspect A through Aspect J (for example, the sheet conveying device 110). The image forming device is configured to form an image an a sheet (for example, the sheet P). The sheet conveying device is configured to convey the sheet from the sheet container to the image forming device.

According to this configuration, as described in the above-described embodiments, a sound of collision generated when the trailing end of the sheet that is conveyed toward the image forming device contacts the guide can be reduced.

Aspect L.

In Aspect L, an optional device (for example, the ADF 111) used for an image forming apparatus (for example, the image forming apparatus 100) includes the sheet conveying device according to any one of Aspect A through Aspect J (for example, the sheet conveying device 110).

According to this configuration, as described in the above-described embodiments, a sound of collision generated when the trailing end of the sheet contacts the guide can be reduced.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A sheet conveying device comprising:
a sheet container configured to load multiple sheets;
a sheet feeder configured to feed a sheet out of the multiple sheets in the sheet container;
a separator configured to separate the sheet from another sheet fed together with the sheet;
a guide having a guide surface configured to guide the sheet passing the separator such that the sheet is fed in a predetermined sheet conveying direction and an elastic body configured to guide the sheet after passing by the guide surface,
an upstream end in the sheet conveying direction of the guide surface of the guide being located lower than a downstream end in the sheet conveying direction of the separator; and
a projection disposed facing the separator at the upstream end in the sheet conveying direction of the guide surface.

2. The sheet conveying device according to claim 1, wherein the sheet container includes a container guide surface disposed at a downstream end in the sheet conveying direction of the sheet container, the container guide surface configured to guide a lower surface of the sheet,
wherein the upstream end in the sheet conveying direction of the guide surface of the guide is located lower than a downstream end in the sheet conveying direction of the container guide surface of the sheet container, and
wherein the separator is located higher than the container guide surface of the sheet container.

3. The sheet conveying device according to claim 1, further comprising a sheet conveyor disposed higher than the sheet container, the sheet conveyor configured to convey the sheet fed from the sheet container,
wherein the guide surface is curved such that the sheet is conveyed toward the sheet conveyor.

4. The sheet conveying device according to claim 3, further comprising a first drive transmission state switcher and a second drive transmission state switcher,
the first drive transmission state switcher configured to switch a drive transmission from a drive source to the sheet feeder between a drive activated state and a drive deactivated state, and
the second drive transmission state switcher configured to switch a drive transmission from the drive source to the sheet conveyor between a drive activated state and a drive deactivated state.

5. The sheet conveying device according to claim 1, wherein a width of the projection in a sheet width direction perpendicular to the sheet conveying direction is smaller than a width of the separator in the sheet width direction.

6. The sheet conveying device according to claim 1, wherein the guide is movable between a first position at which the guide is positioned and a second position at which the guide is placed outwardly from the first position.

7. The sheet conveying device according to claim 6, further comprising:
a cover disposed openably closable to an apparatus body of an image forming apparatus; and
a state changing body configured to position the guide when the cover contacts the apparatus body to close and configured to release the guide when the cover separates from the apparatus body to open.

8. The sheet conveying device according to claim 7, further comprising a cushioning material,
wherein the state changing body causes the guide to contact the cushioning material to fix the guide.

9. The sheet conveying device according to claim 8, wherein the cushioning material is disposed across an entire area of the guide in a sheet width direction perpendicular to the sheet conveying direction.

10. The sheet conveying device according to claim 1, further comprising a sheet guide including resin sheet bodies, the sheet guide configured to guide the sheet after passing the guide surface of the guide,
wherein the resin sheet bodies of the sheet guide are disposed in two layers to the guide.

11. The sheet conveying device according to claim 1, wherein the sheet feeder continues rotating for a predetermined period of time after a trailing end of the sheet has passed through a nip region where the sheet feeder and the separator contact each other.

12. An image forming apparatus comprising:
an image forming device configured to form an image on a sheet; and
the sheet conveying device according to claim 1, configured to convey the sheet from the sheet container to the image forming device.

13. An optional device comprising the sheet conveying device according to claim 1, configured to convey the sheet from the sheet container to an image forming apparatus.

14. The sheet conveying device according to claim 1, wherein the elastic body includes a resin material.

15. The sheet conveying device according to claim 1, wherein the elastic body includes multiple elastic portions in multiple layers.

16. The sheet conveying device according to claim 1, wherein the elastic body is a sheet shaped body.

17. A sheet conveying device comprising:
   a sheet container configured to load multiple sheets;
   a sheet feeder configured to feed a sheet out of the multiple sheets in the sheet container;
   a separator configured to separate the sheet from another sheet fed together with the sheet;
   a guide having a guide surface configured to guide the sheet passing the separator such that the sheet is fed in a predetermined sheet conveying direction;
   an upstream end in the sheet conveying direction of the guide surface of the guide being located lower than a downstream end in the sheet conveying direction of the separator;
   a sheet conveying body disposed downstream from the guide in the sheet conveying direction, the sheet conveying body configured to convey the sheet; and
   a projection disposed facing the separator at the upstream end in the sheet conveying direction of the guide surface,
   the sheet being conveyed with slack between the sheet container and the sheet conveying body.

18. The sheet conveying device of claim 17, wherein a linear velocity of the sheet feeder is greater than a linear velocity of the sheet conveying body.

19. An image forming apparatus comprising:
   an image forming device configured to form an image on a sheet; and
   the sheet conveying device according to claim 17, configured to conveying the sheet from the sheet container to the image forming device.

* * * * *